Patented Aug. 11, 1925.

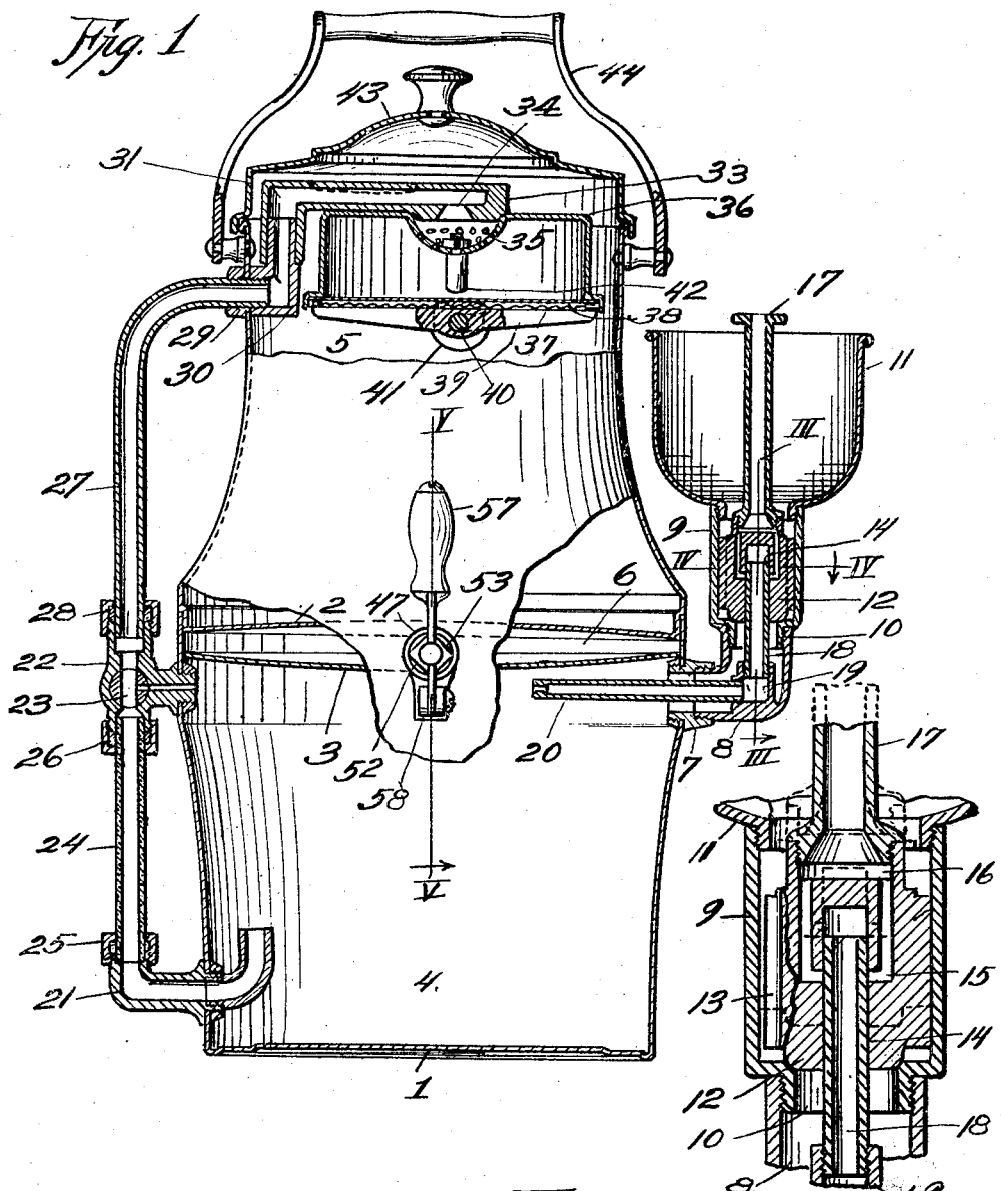

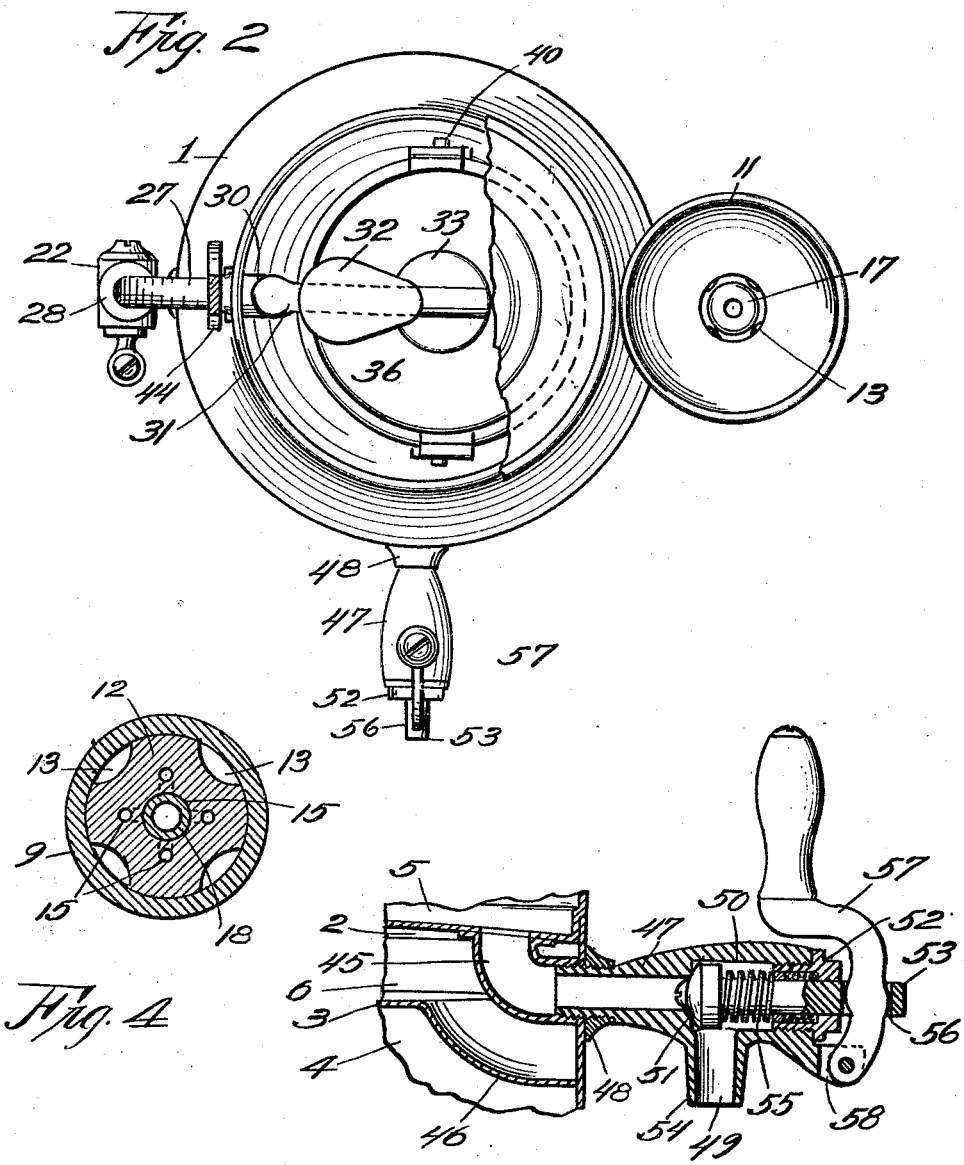

1,549,091

UNITED STATES PATENT OFFICE.

HENRY D. KELLY, OF KANSAS CITY, MISSOURI.

COFFEEPOT.

Application filed January 8, 1923. Serial No. 611,310.

*To all whom it may concern:*

Be it known that I, HENRY D. KELLY, a citizen of the United States, residing at Kansas City, in the county of Jackson and State of Missouri, have invented a certain new and useful Improvement in Coffeepots, of which the following is a complete specification.

This invention relates to coffee pots of that kind in which ground coffee is subjected to the action of steam under pressure for producing the beverage and forcing it through a filter into the beverage chamber, and my object is to produce an efficient article of this character which can be made in various sizes so as to be suitable for restaurant or domestic purposes.

With this general object in view, the invention consists in certain novel and useful features of construction and combinations of parts as hereinafter described and claimed; and in order that it may be fully understood, reference is to be had to the accompanying drawings, in which:—

Figure 1 is a view chiefly in central vertical section, of a coffee pot embodying the invention;

Figure 2 is a top plan view of the coffee pot with the lid broken away and the handle in section;

Figure 3 is a vertical section taken on the line III—III of Figure 1 but on an enlarged scale;

Figure 4 is a horizontal section taken on the line IV—IV of Figure 1, but on the same scale as Figure 3; and Figure 5 is an enlarged vertical section taken on the line V—V of Figure 1.

In the said drawings, where similar reference characters identify corresponding parts, 1 is a coffee pot subdivided by horizontal partitions 2 and 3 into an upper or beverage chamber, a lower or boiler chamber 4, and an intermediate or dead-air chamber 6.

Secured in the wall and near the upper end of the boiler chamber is a coupling nut 7, and engaging the same is an elbow coupling 8. Superimposed under the elbow coupling 8 is a tubular nek 9 having a reduced lower end 10 screwed into the upper end of the coupling 8, and screwed into the upper end of the neck 9 is a filling cup 11 of substantial proportions so as to constitute a funnel.

Fitting slidingly in the neck is a valve 12 which normally rests upon the reduced end of the neck and closes communication between the latter and the interior of the pot, and said valve is provided with vertical recesses forming waterways 13 on its exterior side and with a central port 14 which is closed at its upper end. One or more ports 15 connect port 14 below its upper end with a chamber 16 formed in the upper end of the valve, and communicating with said chamber is a tubular handle 17, the latter being screwed rigidly in position.

Fitting slidingly in the port 14 of the valve and when the latter is in normal or closed position, terminating above the lower end of the port or ports 15, is an air conduit 18, the lower end of the same being secured in a tubular post 19 formed within the elbow coupling 8, and secured also to said tubular post and extending through the coupling nut 7 and into the upper part of the boiler chamber is an air conduit 20 having a constricted mouth, by preference.

When it is desired to charge the boiler chamber with water, the attendant grasps handle 17 and lifts the valve until the lower end of port or ports 15 is in communication with the upper end of the air conduit 18, so that as water is poured into the funnel and passes through the water ways 13 and the coupling into the boiler chamber, air may vent through said air conduit and then through port 15 and the tubular handle of the valve. In the event pressure of steam due to boiling the water in chamber 4, becomes excessive, the pressure will automatically raise valve 12 from its seat and the excess steam will pass up through the neck 9 and out of the funnel, the valve receding the instant the pressure drops to normal. In actual practice, it will be obvious that the valve will be constantly moving upward and downward a distance imperceptible to the eye due to the change of pressure within the boiler chamber.

Communicating with the lower part of the boiler chamber is a pipe 21 having upturned ends or connections within and without the boiler, and vertically above said pipe is a valve casing 22 communicating with the boiler chamber at the upper part thereof. A valve 23 is mounted in said valve casing, and below said valve a glass gage tube 24 is disposed and is connected at its lower and upper ends respectively by nuts 25 and 26 with the outer upturned end of pipe 21 and the lower end of the valve casing 22, it being noted that the inner end of the pipe 21 projects upward to a plane above the nut 25 so that the operator can always read the level of the water standing in the boiler chamber and hence know when it is proper to recharge the same.

When water is being brought to the requisite temperature it is desirable that the steam generated shall be confined and not pass upwardly through the valve 23. The latter is, therefore, turned so as to establish communication between the interior of the boiler chamber at its upper end and the upper end of the gage tube. When the desired pressure is attained in the boiler chamber however, the valve is adjusted as shown in Figure 1 so that steam may pass from the upper part of said boiler chamber through the valve and upwardly through the steam conduit 27 connected at its lower end by a nut 28 with the upper end of the valve casing 22. The upper end of the conduit 27 extends through a packing or jam nut 29 into the beverage chamber 5, and into a coupling tube 30 within said chamber, and fitting upon the upper end of said tube or coupling 30, is the dispensing arm of a conduit 31, provided with laterally projecting grips or handles 32, and terminating over the vertical center of the pot in a circular head or enlargement 33 having a downwardly-opening passage 34 communicating with a perforated depression 35 formed centrally within a cylinder container 36 for ground coffee.

The container is of inverted cup form and is closed at its open or lower end by a foraminous bottom 37 covered at its upper side by a paper filter 38 or the like. A skeleton or spider 39 carries and underlies the foraminous bottom to stiffen and strengthen the same and is provided with a transverse shaft 40 for engaging notched ears 41 depending from the container for holding the bottom in place. When it is desired to introduce the ground coffee, the cup including the conduit 31 is inverted to receive the charge of coffee, and while in such position the paper filter and the foraminous bottom and spider are secured in position, a pin 42 depending from the depressed perforated portion 35 of the container serving to guard against accidental slipping of the filter in the cup or container on restoring the same to upright or operative position.

The pot is provided with a removable lid 43 and any suitable type of handle, the handle 44 shown being of the bail type, and designed for use chiefly with the larger type of pot. For a smaller pot a handle of the ordinary coffee pot type may be employed. For the larger type of pot the following construction is provided for effecting the discharge of the beverage.

45 is an elbow communicating at its upper end with the beverage chamber through the partition 2, and 46 is a depressed portion of the partition 3 to provide an air space entirely around said elbow 45 and thus protect coffee standing therein from being boiled when steam is being generated in the boiler chamber, as it is found that the beverage deteriorates if boiled after being made.

47 is a valve casing screwed into the outer end of the elbow 45 and held firmly in place by a jam-nut 48. At an intermediate point the valve casing is provided with a down spout or nozzle 49, and from the rear wall of said down spout or nozzle the bore of the valve casing is enlarged, as at 50 to provide a valve seat 51. A packing nut 52 closes the outer end of the enlargement 50 of the bore, and the stem of the valve 53 projects outwardly through said packing nut, said valve being normally closed by a spiral spring 55 bearing at its opposite ends against the valve and the packing nut 52. Exterior to the packing nut, the valve stem is provided with an opening 56 through which extends a lever 57 pivoted at its lower end to bifurcated lugs 58 projecting from the outer ends of the valve casing 47, the arrangement being such that outward movement is imparted to the upper or free end of the lever, unseats the valve and permits the beverage to flow from the beverage chamber through the spout or nozzle 49, the release of the lever resulting in the instant closure of the valve under the action of the spring 55. By the location of the valve and valve seat at the rear wall of the spout or nozzle, and the communication of the enlargement 50 of the bore of the valve with the spout both back and forward of and around said valve, the nozzle is instantly evacuated of coffee and there is no drip or drainage that takes place after the valve has been closed as what may stand in the chamber or enlargement 50 drops into the cup or vessel placed under the spout before the latter can be removed after releasing the valve.

As the function and cooperation of the various parts have been described in detail in connection with the detail construction of such parts, it is not believed that any recapitulation of the operation is necessary, and it will of course be understood that the invention is susceptible of modification in various particulars without departing from the principle of construction and the mode of operation involved and without departing from the spirit and scope of the appended claims.

I claim:

1. A pot having boiler and beverage chambers, valve-controlled filling means for the boiler chamber, means for venting the boiler chamber by the unseating of the valve, a gage glass connected to the boiler chamber near the top and bottom thereof, a conduit leading into the upper part of the beverage chamber, a valve for establishing communication between the upper end of the gage, the upper part of the boiler chamber and said conduit, or for closing communication between the upper part of the boiler chamber and the upper end of the gage glass, or between the upper end of the boiler chamber and the said conduit, a ground coffee container in the beverage chamber having a filter controlled discharge, and means for receiving steam from said conduit and discharging it onto ground coffee within said container.

2. A pot having boiler and beverage chambers, valve-controlled filling means for the boiler chamber, means for venting the boiler chamber by the unseating of the valve, a gage glass connected to the boiler chamber near the top and bottom thereof, a conduit leading into the upper part of the beverage chamber, a valve for establishing communication between the upper end of the gage, the upper part of the boiler chamber and said conduit, or for closing communication between the upper part of the boiler chamber and the upper end of the gage glass, or between the upper end of the boiler chamber and the said conduit, a lid for the beverage chamber and a beverage discharging means.

3. A pot having superimposed boiler, dead air and beverage chambers, means for simultaneously charging the boiler chamber with water and venting the air from said chamber, means for visually indicating the depth of water in said chamber, means for conducting steam from said chamber to the beverage chamber, a ground coffee container to receive the steam and discharge means leading from the beverage chamber through the dead air chamber to the exterior of the pot.

In witness whereof I hereunto affix my signature.

HENRY D. KELLY.